(12) United States Patent
Nakamura et al.

(10) Patent No.: US 9,126,334 B2
(45) Date of Patent: Sep. 8, 2015

(54) ROBOT SYSTEM AND METHOD OF CONTROLLING THE ROBOT SYSTEM

(71) Applicant: KABUSHIKI KAISHA YASKAWA DENKI, Kitakyushu-shi (JP)

(72) Inventors: Tamio Nakamura, Kitakyushu (JP); Dai Kouno, Kitakyushu (JP); Takashi Suyama, Kitakyushu (JP); Takashi Nishimura, Kitakyushu (JP); Tomohiro Matsuo, Kitakyushu (JP); Shinichi Ishikawa, Kitakyushu (JP); Tomoki Kawano, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/207,660

(22) Filed: Mar. 13, 2014

(65) Prior Publication Data

US 2014/0277726 A1     Sep. 18, 2014

(30) Foreign Application Priority Data

Mar. 18, 2013   (JP) ................. 2013-054603

(51) Int. Cl.
 *G05B 15/00*   (2006.01)
 *G05B 19/00*   (2006.01)
 *B25J 9/16*    (2006.01)

(52) U.S. Cl.
 CPC .............. *B25J 9/1676* (2013.01); *B25J 9/1612* (2013.01)

(58) Field of Classification Search
 CPC .......... B25J 9/1676; B25J 9/1612; B25J 9/16; A61F 9/029; F16P 3/14; F16P 3/00; G05B 19/00
 USPC ............ 700/245, 257, 258, 259; 318/568.11, 318/568.12, 568.16, 568.2; 340/5.2
 See application file for complete search history.

(56) References Cited

U.S. PATENT DOCUMENTS

| 5,315,289 | A  | * | 5/1994  | Fuller et al. ................... 340/532  |
| 5,956,465 | A  | * | 9/1999  | Takagi et al. ................. 700/255    |
| 7,783,386 | B2 | * | 8/2010  | Merte et al. ................... 700/255   |
| 7,863,848 | B2 | * | 1/2011  | Sjoberg .................... 318/568.11    |
| 7,890,235 | B2 | * | 2/2011  | Self et al. ......................... 701/50 |
| 8,315,735 | B2 | * | 11/2012 | Nihei et al. .................... 700/245  |
| 8,364,313 | B2 | * | 1/2013  | Akashi et al. ................. 700/264    |

(Continued)

FOREIGN PATENT DOCUMENTS

| CA | 002334772 | A1 * | 12/1999 | ............... F16P 3/14 |
| FR | 2658586   | A1 * | 8/1991  | ............... F16P 3/00 |
| JP | 61-173886 |      | 8/1986  |                            |

(Continued)

OTHER PUBLICATIONS

Japanese Office Action for corresponding JP Application No. 2013-054603, Aug. 19, 2014.

(Continued)

*Primary Examiner* — Dalena Tran
*Assistant Examiner* — Jaime Figueroa
(74) *Attorney, Agent, or Firm* — Mori & Ward, LLP

(57) ABSTRACT

A robot system is provided, which includes a robot having an operable operation arm, an attachment detector for detecting one or more attachments, each attached to a wearing article equipped by a movable body, and a motion-control changer for changing a motion control of the robot based on a detection result detected by the attachment detector.

12 Claims, 9 Drawing Sheets

(56) References Cited

U.S. PATENT DOCUMENTS

2009/0069943 A1* 3/2009 Akashi et al. ................. 700/264
2012/0326837 A1   12/2012 Ajay et al.

FOREIGN PATENT DOCUMENTS

| JP | 4219870 B2 | 2/2006 |
| JP | 2009-191420 | 8/2009 |
| JP | 5066457 B2 | 8/2009 |
| JP | 2013-517545 | 5/2013 |

OTHER PUBLICATIONS

Chinese Office Action for corresponding CN Application No. 201410040151.X, Jun. 3, 2015.

* cited by examiner

ROBOT SYSTEM AND METHOD OF CONTROLLING THE ROBOT SYSTEM

CROSS-REFERENCE TO RELATED APPLICATION(S)

The application claims priority under 35 U.S.C. §119 to Japanese Patent Application No. 2013-054603, which was filed on Mar. 18, 2013, the entire disclosure of which is hereby incorporated by reference.

TECHNICAL FIELD

This disclosure relates to a robot system and a method of controlling the robot system.

BACKGROUND OF THE INVENTION

Conventionally, robots with an operable operation arm have been proposed. Normally, a safety fence is provided in the circumference of the operation arm to divide an operating range of the operation arm from an operating range of a person. However, for example, the person may enter inside the safety fence to supply objects to be processed.

In recent years, cases where both the operation arm and the person work together within a space where there is no partition have been increased. In such a robot, certain safety measures are taken, for example, to avoid risks of interference of the robot with the person when the person enters into the operating range of the operation arm. For example, JP4,219,870B2 discloses a man-machine operation system, which includes a transmitter attached to a person, a receiver attached to a machine corresponding to the transmitter, and a position detector for detecting the position of the person with respect to the position of the machine based on an output signal of the receiver.

In the man-machine operation system disclosed in JP4,219,870B2, the spatial relationship of the person with respect to the machine is detected by the position detector, and the operating range of the person is set based on the spatial relationship.

Alternatively, the safety measures for the person (operator) may include the person wearing protectors for protecting body parts of the person. Such protectors are often to protect the body parts of the person, such as a helmet for protecting the person's head and a pair of goggles for protecting the person's eyes, and various types of protector have been proposed.

SUMMARY OF THE INVENTION

According to one aspect of the present disclosure, a robot system is provided, which includes a robot having an operable operation arm, an attachment detector for detecting one or more attachments, each attached to a wearing article equipped by a movable body, and a motion-control changer for changing a motion control of the robot based on a detection result detected by the attachment detector.

The wearing article may be a protector for protecting the movable body.

The robot may have an articulated operation arm.

The robot may include a pedestal for supporting the operation arm, and a moving mechanism for moving the pedestal.

The motion-control changer may change the motion control based on the number of the wearing articles equipped by the movable body.

The motion-control changer may set a wearing level of the movable body based on a weighting value defined for each type of the wearing articles, and may change the motion control based on the wearing level.

The motion-control changer may select, when the wearing article equipped by the movable body does not satisfy a predetermined condition, at least any one of the motion controls including a stop of an operation of the robot, a reduction in an operating speed of the robot, a reduction in an output of an actuator of the robot, and a reduction in an operating range of the robot.

The motion-control changer may perform, when a specific attachment is not detected, at least any one of a stop of an operation of the robot, an issue of an alert, a reduction in an operating speed of the robot, a reduction in an output of an actuator of the robot, and a reduction in an operating range of the robot.

The attachment detector may read data from an IC tag attached to each wearing article to detect the existence and types of the wearing articles.

The attachment detector may verify a bar code attached to each wearing article to detect the existence and types of the wearing articles.

The attachment detector may have a gate through which the movable body passes, and a detector disposed at the gate and for detecting the attachment.

The attachment detector may further have a safety fence surrounding the circumference of the robot system, and the gate may be disposed so that the movable body can enter into and exit the safety fence only by passes passing through the gate.

According to another aspect of the present disclosure, a method of controlling a robot system is provided, which includes detecting one or more attachments, each attached to a wearing article equipped by a movable body, and changing a motion control of the robot having an operable operation arm, based on the detection result.

Further purposes or other features of the present invention will be apparent below from preferable embodiments described with reference to the accompanying drawings.

BRIEF DESCRIPTION OF THE DRAWINGS

The present disclosure is illustrated by way of example and not by way of limitation in the figures of the accompanying drawings, in which the like reference numeral indicate like elements and in which.

DETAILED DESCRIPTION

Hereinafter, robot systems according to several embodiments will be described using the accompanying drawings.

Embodiment 1

Figure 1:
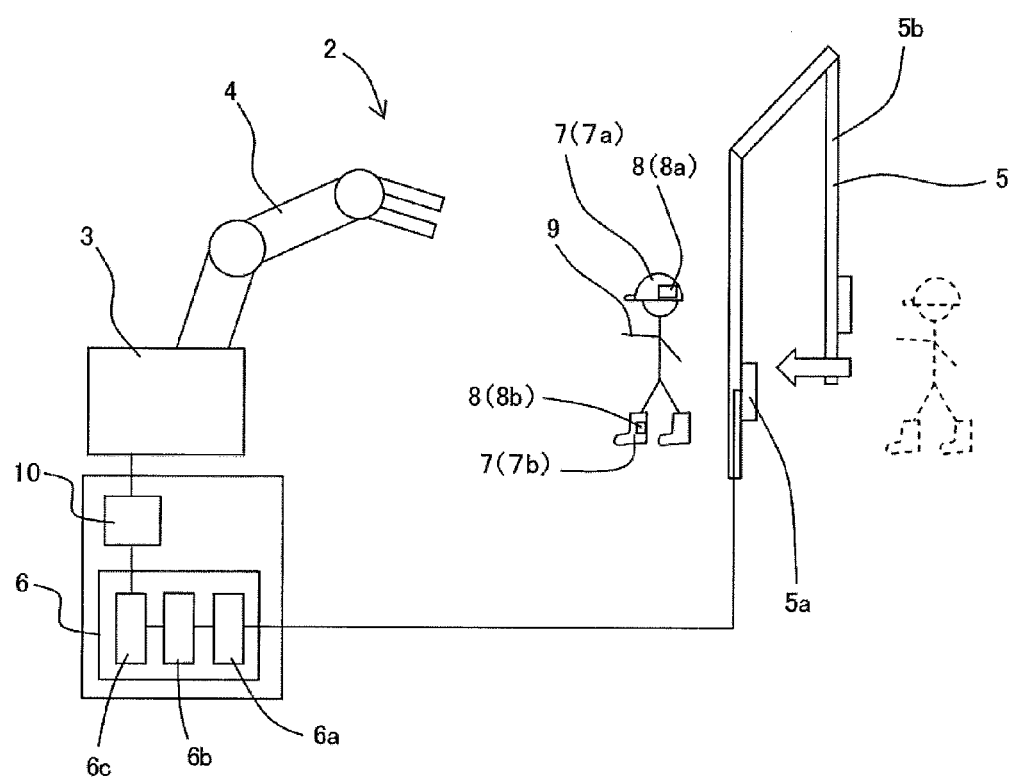
FIG. 1 is a schematic diagram illustrating a robot system according to Embodiment 1.
Figure 2:
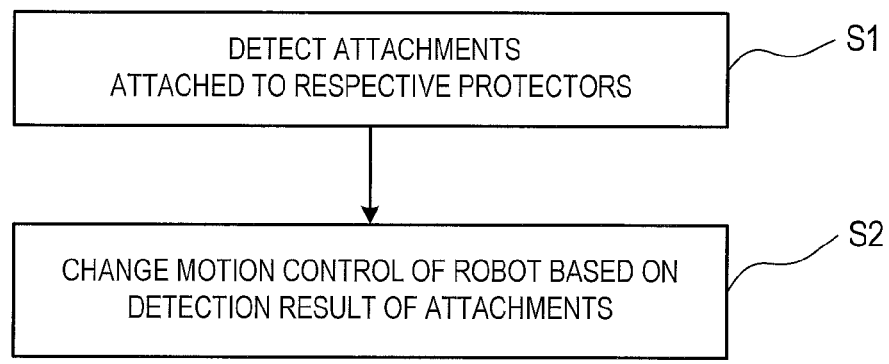
FIG. 2 is a flowchart illustrating a changing procedure of a motion control of a robot in the robot system of FIG. 1.

FIG. 1 is a schematic diagram illustrating a robot system 2 according to Embodiment 1. FIG. 2 is a flowchart illustrating a changing procedure of a motion control of a robot 3 in the robot system 2.

As illustrated in FIG. 1, the robot system 2 includes the robot 3, an attachment detector 5, a motion-control changer 6, and a motion controller 10. The robot 3 has an operable operation arm 4. The term "operable" as used herein refers to that the operation arm 4 can perform, for example, telescopic, extending and/or flexing, and/or turning operations by an actuator for converting energy, such as electric power or hydraulic pressure, into a physical motion of the operation arm 4.

The motion controller 10 controls the operations of the robot 3 and the operation arm 4. The motion controller 10 outputs an operation instruction to the actuator of the operation arm 4 according to a preset operation program, and it monitors the positional information and the like of the actuator to control the operation arm 4 to carry out an operation according to the operation instruction. In addition, the motion controller 10 changes an operating speed of the operation arm 4 or stops the operation arm 4 according to an instruction from the motion-control changer 6 (described later).

Note that the robot system 2 has a memory (not illustrated) for storing the operation program and parameters required for the control.

The robot 3 operates at a speed specified by the preset operation program when a movable body 9 (described later) does not exist in the circumference thereof.

The movable body 9 equips with (or wear) one or more protectors 7, and an attachment 8 is attached to each protector 7. An attachment detector 5 detects the attachment(s) 8 attached to the protector(s) 7. The motion-control changer 6 instructs the motion controller 10 so that the motion control of the robot 3 is changed based on a result detected by the attachment detector 5. In detail, as illustrated in FIG. 2, the robot system 2 first detects the attachment(s) 8 attached to the protector(s) 7 (S1: Attachment Detection). Next, the motion control of the robot 3 is changed based on the detection result(s) of the attachment(s) 8 (S2: Motion-control Change).

As illustrated in FIG. 1, the robot system 2 can change the motion control of the robot 3 according to a wearing state of the protector(s) 7 equipped or worn by the movable body 9 and, thus, safety can be improved. The term "wearing state" as used herein includes, for example, a case where the selection of the protector(s) 7 worn by the movable body 9 is not appropriate, and a case where the movable body 9 has forgotten to wear the protector(s) 7. The robot system 2 can change the motion control so that the operation is more restricted (for example, the speed of the robot 3 is reduced) so that the motion control is adapted to the current wearing state. Further, since the robot system 2 changes the motion control of the robot 3 according to the wearing state of the protector(s) 7 of the movable body 9, if the wearing state of the protector(s) 7 of the movable body 9 is appropriate, an excessive speed restriction and an excessive operational restriction of the robot 3 will be suppressed, a takt time will be shortened, and the productivity and availability of the robot 3 will be improved.

The robot system 2 illustrated in FIG. 1 includes the robot 3 which is installed on a floor, a ceiling, a wall surface or the like, where the robot 3 has the articulated operation arm 4. The robot 3 is not limited to such a robot 3, as long as it has the operable operation arm 4. For example, although illustration is omitted, the robot 3 may have a pedestal for supporting the operation arm 4, and a moving mechanism for translating the pedestal within a predetermined range. In such a robot system provided with the robot having the moving mechanism, the motion control by the motion controller 10 may include, in addition to the motion control of the operation arm, the motion control of the moving mechanism.

The term "movable body" as used herein includes, for example, a person, a hand lift, a conveying carrier, and a self-propellable robot other than the robot 3. The term "protector" as used herein refers to an article that can be equipped or worn by the movable body 9. For example, the movable body 9 wears the protector(s) for the purpose of safety measures. For example, if the movable body 9 is a person, the protector(s) 7 protect body part(s) of the person, respectively.

As described above, the attachment 8 is attached to each of the protectors 7. The attachment 8 may store information on the protector 7 to which the attachment 8 concerned is attached, or a code (identifier) which is obtained by converting the information according to a certain rule. Note that, these information are collectively referred to as "the information on the protector(s)."

In FIG. 1, the movable body 9 is a person, and the person wears the helmet 7a and the safety shoes 7b, as the wearing articles or the protectors 7. In addition, IC tags 8a and 8b which store the information on the respective protectors 7 are attached to the helmet 7a and the safety shoes 7b, respectively, as attaching components or the attachments 8. Although illustration is omitted, the protectors 7 may include, other than the helmet 7a and the safety shoes 7b, for example, the gloves, the goggles, the protective clothing, a mask, and a neck protector. Alternatively, "the information on the protector(s)" may be a bar code related to the protector(s). Contrary, the attachment 8 may be configured so that the existence of the protector 7 is detected by the attachment detector 5, instead of the attachment 8 having the information on the protector 7.

Figure 7:
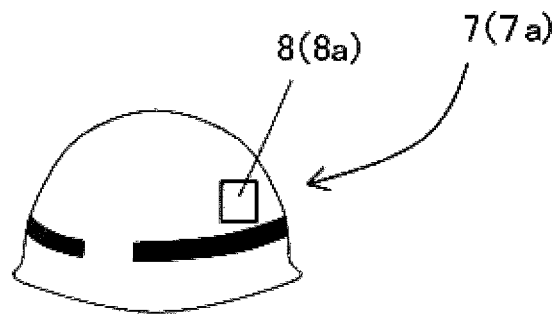
FIG. 7 is a schematic diagram illustrating a helmet to which an IC tag is attached, where the IC tag has information on the helmet.
Figure 8:
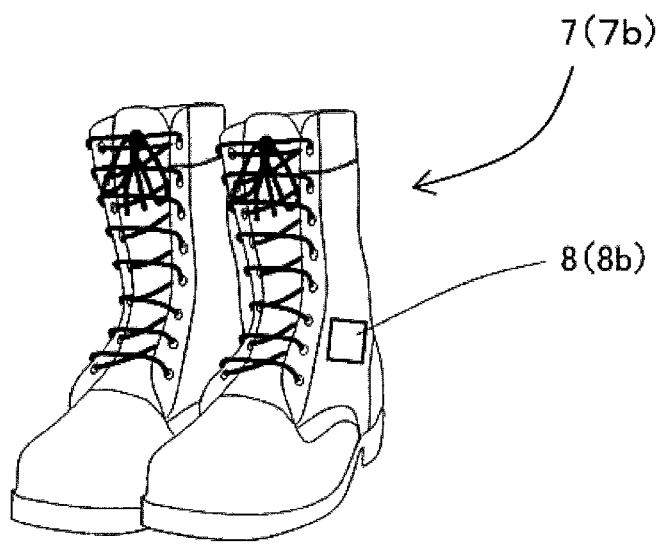
FIG. 8 is a schematic diagram illustrating a pair of safety shoes to which an IC tag is attached, where the IC tag has information on the safety shoes.
Figure 9:
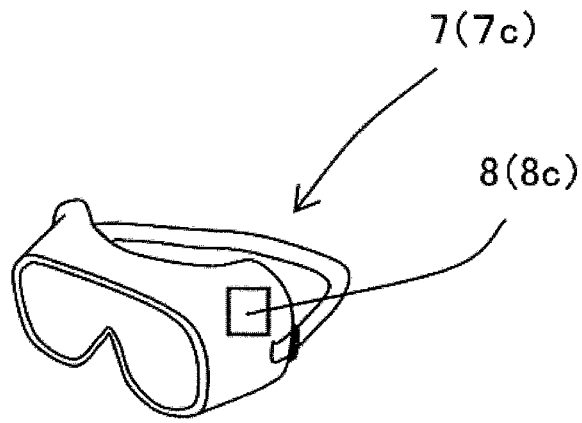
FIG. 9 is a schematic diagram illustrating a pair of goggles to which an IC tag is attached, where the IC tag has information on the goggles.
Figure 10:
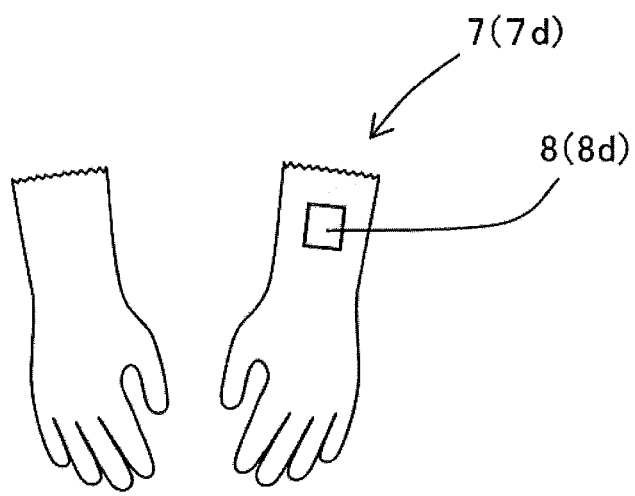
FIG. 10 is a schematic diagram illustrating a pair of gloves to which an IC tag is attached, where the IC tag has information on the gloves.
Figure 11:
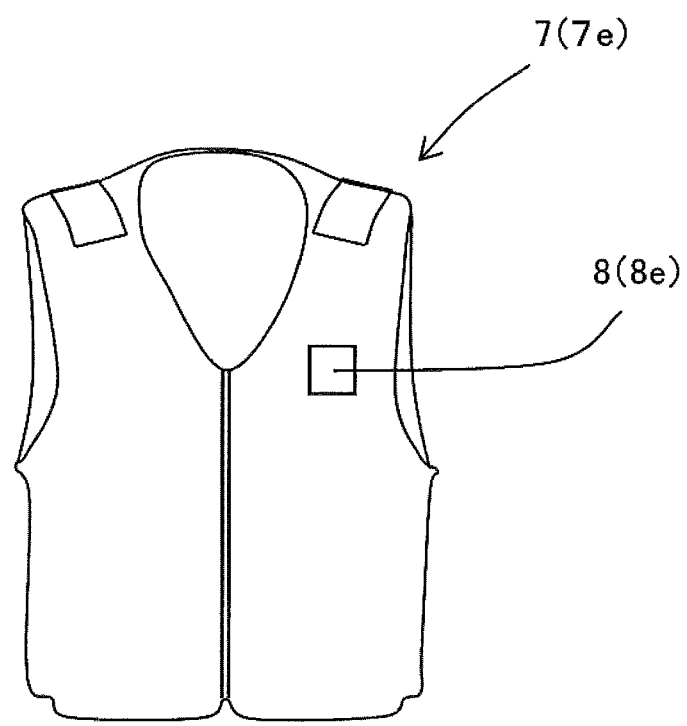
FIG. 11 is a schematic diagram illustrating protective clothing to which an IC tag is attached, where the IC tag has information on the protective clothing.

In FIG. 7, the IC tag 8a having the information on the helmet 7a is attached to the helmet 7a. Alternatively, in FIG. 8, the IC tag 8b having the information on the safety shoes 7b is attached to the safety shoes 7b. Alternatively, in FIG. 9, the IC tag 8c having the information on goggles 7c is attached to the goggles 7c. Alternatively, in FIG. 10, the IC tag 8d having the information on gloves 7d is attached to the gloves 7d. Alternatively, in FIG. 11, the IC tag 8e having the information on protective clothing 7e is attached to the protective clothing 7e.

Accordingly, as illustrated in FIG. 1, the attachment detector 5 may read data from the IC tags (attachments) 8 and detect the existence and types of the protectors 7. Such an attachment detector 5 may include an IC tag reader 5a which reads the data from the IC tags 8. Note that, in FIG. 1, the attachment detector 5 has a gate 5b through which the movable body 9 passes, and the IC tag reader 5a disposed at the gate 5b.

Although illustration is omitted, it may also be configured so that the circumference of the robot system 2 is surrounded by a safety fence coupled with the gate 5b provided with the IC tag reader 5a, and the movable body 9 is forced to pass through the gate 5b when approaching the robot system 2. According to such an attachment detector 5, when the movable body 9 passes through the gate 5b, the data stored in the IC tags 8 attached to the protectors 7 can certainly be read by the IC tag reader 5a. Although illustration is omitted, the attachment detector 5 may verify the bar codes (printing is also possible) attached to the protectors to detect the existence and types of the protectors. Such an attachment detector 5 may include a bar code reader.

As illustrated in FIG. 1, the motion-control changer 6 outputs an instruction to the motion controller 10 based on the detection result of the attachment detector 5. The motion controller 10 changes the motion control of the robot 3 in response to the instruction. The motion-control changer 6 may includes a detection information receiver 6a for receiving detection information from the attachment detector 5, a motion-control selector 6b for selecting the motion control of the robot 3 which is suitable for the wearing state of the protector(s) 7 of the movable body 9 based on the detection information received by the detection information receiver 6a, and a motion-control transmitter 6c for transmitting a selected motion control to the motion controller 10.

The above embodiment is merely one example of this disclosure, and can be modified as follows.

Modification 1

Figure 3:
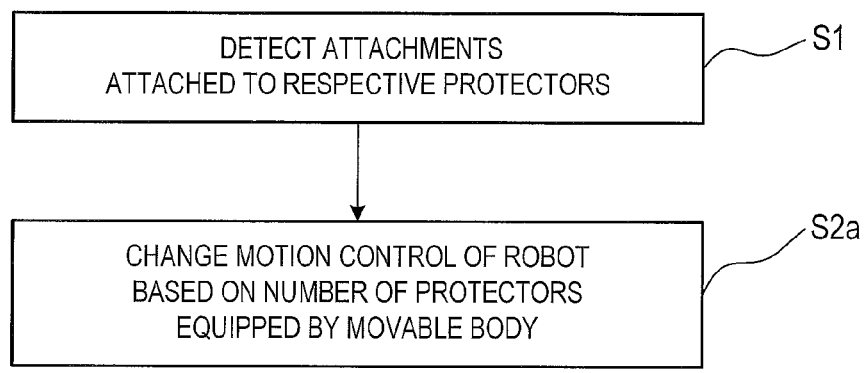
FIG. 3 is a flowchart illustrating Modification 1 of the procedure of FIG. 2.

FIG. 3 is a flowchart illustrating a changing procedure of the motion control of the robot 3, in a robot system according to Modification 1 of the above embodiment. In the robot system according to Modification 1, the motion-control changer 6 changes the motion control of the robot 3 based on the number of protectors 7 worn by the movable body 9, in other words, based on the number of protectors 7 detected by the attachment detector 5.

In detail, as illustrated in FIG. 3, first, the attachments 8 attached to the respective protectors 7 are detected (S1: Attachment Detection). Here, the method of detecting the attachments is similar to that of the robot system 2 according to Embodiment 1. Next, the motion control of the robot 3 is changed based on the number of protectors 7 (S2a: Motion-control Change).

For example, it can be said that the safety of the movable body 9 is secured at a higher level as the number of the protectors 7 worn by the movable body 9 increases. Therefore, the restrictions on the speed and operation of the robot 3 may be loosened. For example, it is possible to operate the robot at a speed near the operating speed set by the operation program. On the other hand, since it can be said that the movable body 9 is less secured as the number of the protectors 7 worn by the movable body 9 decreases, the restrictions on the speed and operation of the robot 3 may be tightened. For example, it is possible to operate the robot 3 at a speed which is slower than a half the operating speed set by the operation program. Thus, since the criterion to select the motion control of the robot 3 is based on the number of the protectors 7 detected by the attachment detector 5, the motion control of the robot 3 can appropriately be changed according to the wearing state of the protectors 7 of the movable body 9. Since other configurations of the robot system according to Modification 1 are similar to those of the robot system 2 according to Embodiment 1, the description thereof is omitted.

Modification 2

Figure 4:
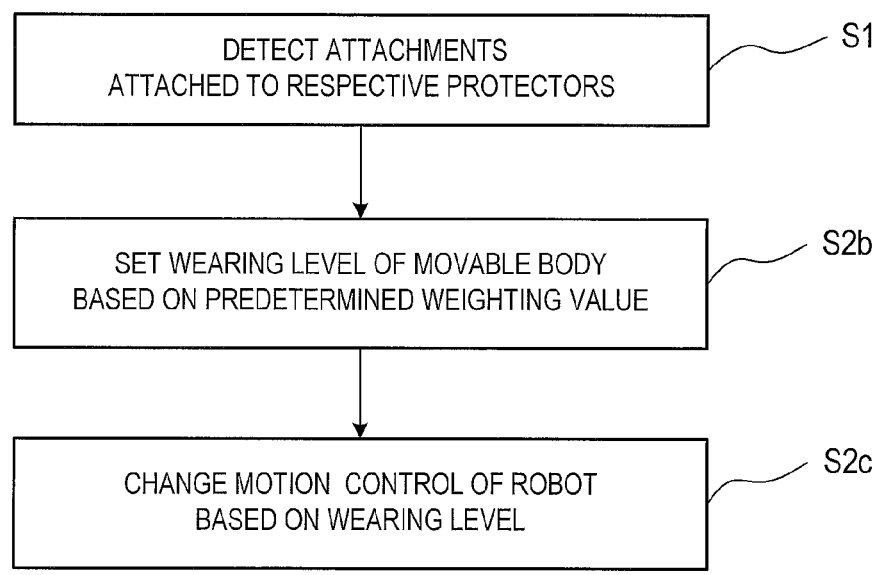
FIG. 4 is a flowchart illustrating Modification 2 of the procedure of FIG. 2.

FIG. 4 is a flowchart illustrating a changing procedure of the motion control of the robot 3, in a robot system according to Modification 2 of Embodiment 1. In the robot system according to Modification 2, the motion-control changer 6 determines a wearing level of the movable body 9 based on a weighting value defined for each type of the protectors 7, and then changes the motion control of the robot 3 based on the wearing level.

In detail, as illustrated in FIG. 4, first, the attachments 8 attached to the respective protectors 7 are detected (S1: Attachment Detection). Here, the method of detecting the attachments 8 is similar to that of the robot system 2 according to Embodiment 1. Next, the motion-control changer 6 determines the wearing level of the movable body 9 based on the weighting value (S2b: Motion-control Change). Next, the motion-control changer 6 changes the motion control of the robot 3 based on the wearing level (S2c: Motion-control Change). Thus, if the wearing level is appropriate, the restrictions on the speed and operation of the robot 3 are decreased, the takt time is shortened, and the productivity and availability of the robot 3 improves. The weighting value can be obtained by converting the safety level of the protector into a numerical value. For example, it is possible to adopt a weighting system where ten points are maximum, where one protector 7 which needs less protection may be assigned with one point, and another protector 7 which needs higher protection may be assigned with ten points.

Note that the term the "protector which needs higher protection" refers to a protector, for example, which protects the person's head and/or eyes, and which induces a higher risk of the safety if the person is not wearing them. Such a protector may include the helmet and/or a visor (or protective eyeglasses). On the other hand, the "protector which needs less protection" refers to a protector, for example, of which the safety risks by not wearing is lower than the "protector which needs higher protection." The "protector which needs less protection" may include the safety shoes and/or the gloves.

Alternatively, even for the same type of protectors 7, the weighting value may be differentiated according to the characteristics of the protectors 7 if the characteristics of the protector 7 differ from each other. For example, if the protector 7 is the helmet, the weighting value of the helmet having the visor which protects the eyes may be different from the weighting value of the helmet without such a visor. Further, the weighting value of the protector 7 may be defined according to a wearing location of the protector 7 on the movable body 9. For example, as for the protector 7 worn on a part of the movable body 9 where comparatively serious damages may be caused when the robot 3 interferes with the movable body 9, a larger weighting value may be given to this protector 7. Specifically, the helmet worn on the person's head may be given a larger weighting value than other types of protector. Thus, the safety can be improved by defining the weighting value and setting the wearing level of the movable body as described above.

The wearing level may be calculated based on the total value of the weighting values of the protectors 7 worn by the movable body 9. That is, the wearing level is higher as the total value of the weighting values increases and, thus, the safety measures of the movable body 9 is improved. Alternatively, an average value may be calculated by dividing the total value of the weighting values by the number of protectors 7 worn by the movable body 9, and the wearing level may be calculated based on the average value of the weighting values. Thus, for example, when the movable body 9 wears a number of protectors 7 with lower weighting values, an excessive increase in the wearing level can be suppressed. The weighting value and the wearing level of the protector 7 can suitably be set according to how the robot 3 is operated. Since other configurations of the robot system according to Modification 2 are similar to those of the robot system according to Embodiment 1, the description thereof is omitted.

Modification 3

Figure 5:
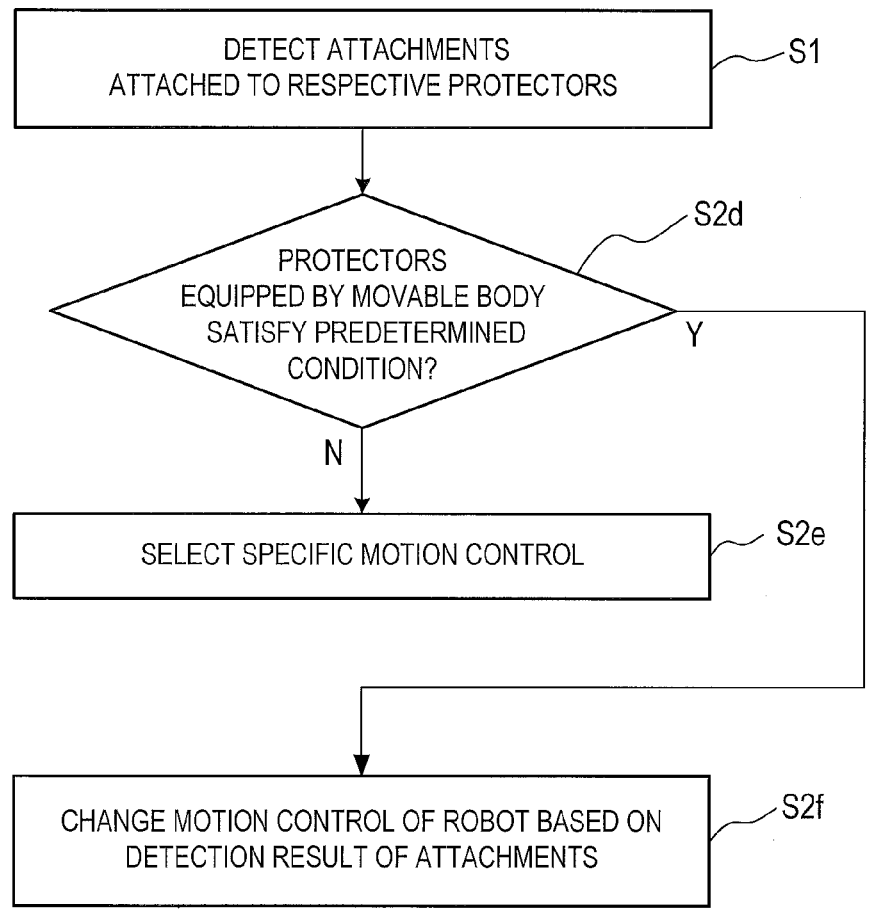
FIG. 5 is a flowchart illustrating Modification 3 of the procedure of FIG. 2.

FIG. 5 is a flowchart illustrating a changing procedure of the motion control of the robot 3, in a robot system according to Modification 3 of Embodiment 1. In the robot system according to Modification 3, the motion-control changer 6 selects a specific motion control when the protector 7 does not satisfy a predetermined condition. The term "specific motion control" as used herein refers to at least any one of, for example, a stop of the operation of the robot 3, a reduction in the operating speed of the robot 3, a reduction in the output of the actuator of the robot 3, and a reduction in the operating range of the robot 3.

In detail, as illustrated in FIG. 5, first, the attachments 8 attached to the protectors 7 are detected (S1: Attachment Detection). Here, the method of detecting the attachments 8 is similar to that of the robot system 2 according to Embodiment 1. Next, the motion-control changer 6 determines whether the protector 7 satisfies the predetermined condition (S2d: Motion-control Change). When the predetermined condition is satisfied, the motion-control changer 6 changes the motion control of the robot 3 based on the detection results of the attachments 8 (S2f: Motion-control Change). On the other hand, when the predetermined condition is not satisfied, the motion-control changer 6 selects the specific motion control (S2e: Motion-control Change).

The specific motion control is, for example, to reduce the interference of the robot 3 with the movable body 9, and the risk at the time of the interference of the robot 3 with the movable body 9, and the safety can be increased by an appropriate selection of the motion control.

Further, although there is no limitation in particular for the predetermined condition, the predetermined condition is preferred to be set based on whether sufficient safety is secured with the protectors 7 worn by the movable body 9, with respect to the way of operation of the robot 3. For example, when changing the motion control of the robot 3 based on the number of protectors, the number of protectors 7 may be used as the setting criterion of the predetermined condition. Alternatively, when setting the wearing level of the movable body 9 based on the weighting value, the wearing level reached a predetermined wearing level may be used as the setting criterion of the predetermined condition. Since other configurations of the robot system according to Modification 3 are similar to those of the robot system according to Embodiment 1, the description thereof is omitted.

Modification 4

Figure 6:
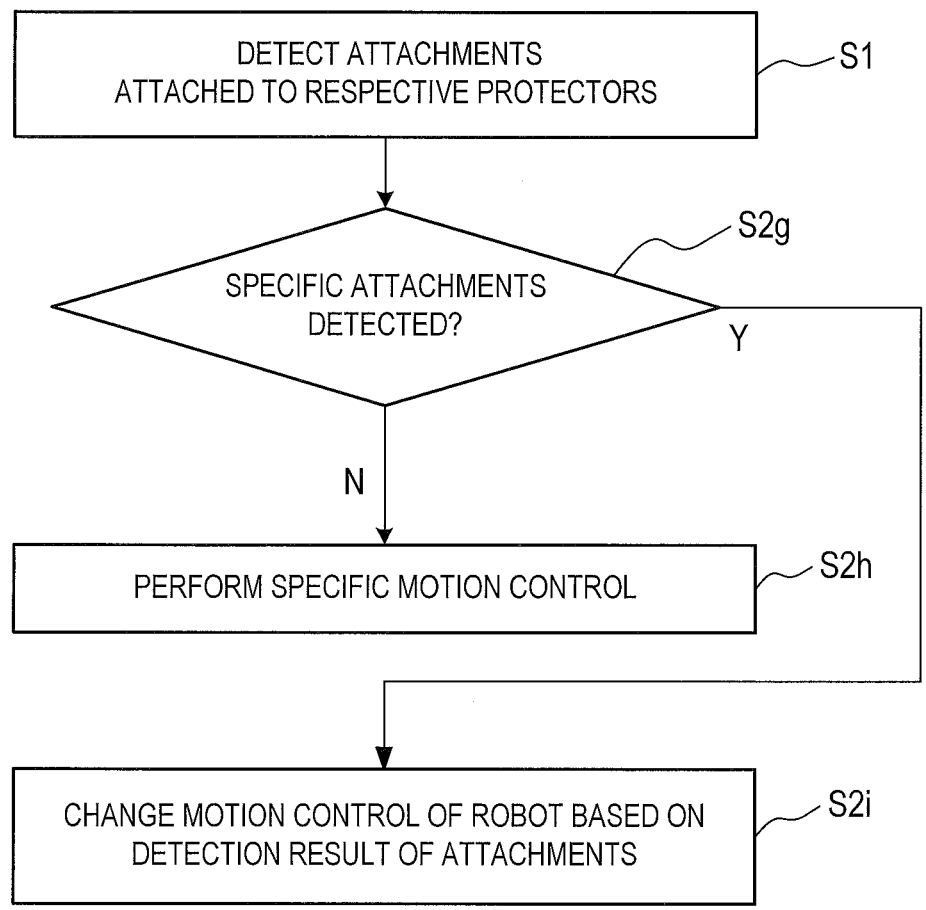
FIG. 6 is a flowchart illustrating Modification 4 of the procedure of FIG. 2.

FIG. 6 is a flowchart illustrating a changing procedure of the motion control of the robot 3, in a robot system according to Modification 4 of Embodiment 1. In the robot system according to Modification 4, the motion-control changer 6 performs the specific motion control when a specific attachment is not detected. The term "specific motion control" as used herein refers to at least any one of, for example, a stop of the operation of the robot 3, an issue of alert, a reduction in the operating speed of the robot 3, a reduction in the output of the actuator of the robot 3, and a reduction in the operating range of the robot 3.

In detail, as illustrated in FIG. 6, first, the attachments 8 attached to the protectors 7 are detected (S1: Attachment Detection). Here, the method of detecting the attachments 8 is similar to that of the robot system 2 according to Embodiment 1. Next, the motion-control changer 6 determines whether the specific attachment 8 is detected (S2g: Motion-control Change). When the specific attachment 8 is detected, the motion-control changer 6 changes the motion control of the robot 3 based on the detection results of the attachments 8 at Step S1 (S2i: Motion-control Change). On the other hand, when the specific attachment is not detected, the motion-control changer 6 performs the specific motion control (S2h: Motion-control Change).

Thus, the safety can be improved by reducing, for example, the interference of the robot 3 with the movable body 9, and the risk at the time of interfering the robot 3 with the movable body 9. The term "specific attachment" as used herein includes the protector 7 worn at a part of the movable body 9 where comparatively serious damages may be caused when the robot 3 interferes with the movable body 9. Specifically, the protector is the helmet worn on the person's head. Thus, a generation of comparatively serious damages can be reduced, or a warning of the generation of the damages can be performed. Since other configurations of the robot system according to Modification 4 are similar to those of the robot system according to Embodiment 1, the description thereof is omitted.

Embodiment 2

Hereinafter, a method of controlling a robot system according to Embodiment 2 is described. The method of controlling the robot system according to Embodiment 2 is the method of controlling the robot system 2 according to the embodiment 1 illustrated in FIG. 1. This controlling method includes an attachment detection step and a motion-control change step. The attachment detection step is a step which detects the attachment(s) 8 attached to one or more protectors 7 worn by the movable body 9 as illustrated in FIG. 1. The motion-control change step is a step which changes the motion control of the robot 3 having the operable operation arm 4 based on the detection result(s) obtained by the attachment detection step.

Next, based on the flowchart illustrated in FIG. 2, a flow of the control in the method of controlling the robot system according to Embodiment 2 is described sequentially. First, in the attachment detection step S1, the attachments 8 attached to the protectors 7 are detected. Next, at the motion-control change step S2, the motion control of the robot 3 having the operable operation arm 4 is changed based on the detection result(s) obtained by attachment detection step S1. According to such a method of controlling the robot system, the safety can be improved. In addition, since the motion control of the robot 3 is changed according to the wearing state of the protector(s) 7 of the movable body 9, the restrictions on the speed and operation of the robot 3 can be reduced, the takt time can be shortened, and the productivity and availability of the robot 3 can be improved.

Alternatively, the method of controlling the robot system may be any one of the methods described in Modifications 2 to 4. That is, the attachment detection step and the motion-control change step may suitably be modified according to the configurations of the robot system of the respective modifications.

In the foregoing specification and specific embodiments of the present invention have been described. However, one of ordinary skill in the art appreciates that various modifications and changes can be made without departing from the scope of the present invention as set forth in the claims below. Accordingly and the specification and figures are to be regarded in an illustrative rather than a restrictive sense, and all such modifications are intended to be included within the scope of present invention. The benefits and advantages, solutions to problems, and any element(s) that may cause any benefit, advantage and or solution to occur or become more pronounced are not to be construed as a critical, required and or essential features or elements of any or all the claims. The invention is defined solely by the appended claims including any amendments made during the pendency of this application and all equivalents of those claims as issued.

What is claimed is:

1. A robot system, comprising:
    a robot having an operable operation arm;
    an attachment detector for detecting one or more attachments, each attached to a wearing article equipped by a movable body; and
    a motion-control changer for changing a motion control of the robot based on a detection result detected by the attachment detector, the motion-control changer sets a wearing level of the movable body based on a weighting value defined for each type of the wearing articles, and changes the motion control based on the wearing level.

2. The robot system of claim 1, wherein the wearing article is a protector for protecting the movable body.

3. The robot system of claim 1, wherein the robot has an articulated operation arm.

4. The robot system of claim 1, wherein the robot includes a pedestal for supporting the operation arm, and a moving mechanism for moving the pedestal.

5. The robot system of claim 1, wherein the motion-control changer changes the motion control based on the number of the wearing articles equipped by the movable body.

6. The robot system of claim 1, wherein the motion-control changer selects, when the wearing articles equipped by the movable body does not satisfy a predetermined condition, at least any one of the motion controls including a stop of an operation of the robot, a reduction in an operating speed of the robot, a reduction in an output of an actuator of the robot, and a reduction in an operating range of the robot.

7. The robot system of claim 1, wherein the motion-control changer performs, when a specific attachment is not detected, at least any one of a stop of an operation of the robot, an issue of an alert, a reduction in an operating speed of the robot, a reduction in an output of an actuator of the robot, and a reduction in an operating range of the robot.

8. The robot system of claim 1, wherein the attachment detector reads data from an IC tag attached to each wearing article to detect the existence and types of the wearing articles.

9. The robot system of claim 1, wherein the attachment detector verifies a bar code attached to each wearing article to detect the existence and types of the wearing articles.

10. The robot system of claim 1, wherein the attachment detector has a gate through which the movable body passes, and a detector disposed at the gate and for detecting the attachment.

11. The robot system of claim 10, wherein the attachment detector further has a safety fence surrounding the circumference of the robot system, and the gate is disposed so that the movable body can enter into and exit the safety fence only by passes passing through the gate.

12. A method of controlling a robot system, comprising:
    detecting one or more attachments, each attached to a wearing article equipped by a movable body; and
    changing a motion control of the robot having an operable operation arm, based on the detection result, wherein the changing the motion control of the robot includes:
    setting a wearing level of the movable body based on a weighting value defined for each type of the wearing articles; and
    changing the motion control based on the wearing level.

* * * * *